United States Patent Office 2,714,596
Patented Aug. 2, 1955

2,714,596

PIGMENT DYES OF THE ISOTHIAZOLANTHRONE SERIES

Ernst Gutzwiller and Wolfgang Schoenauer, Basel, Switzerland, assignors to Sandoz A. G., Basel, Switzerland No Drawing. Application June 8, 1953,
Serial No. 360,382

Claims priority, application Switzerland June 16, 1952

4 Claims. (Cl. 260—303)

The present invention relates to pigment dyes of the isothiazolanthrone series and to the preparation thereof.

It has been found, surprisingly, that valuable pigment dyes are obtained by the action on 5-amino-1,9-isothiazolanthrone of a halogen benzanthrone or a halogen anthraquinone. The thus-obtained condensation products correspond to the formula

Y—R—Z wherein R represents a radical of the benzanthrone or anthraquinone series, Y stands for a radical of the formula

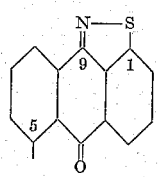

which is connected at the 5-position to R by way of an —NH— bridge, and Z is either identical with Y or represents a hydrogen atom.

Illustrative of the halogen benzanthrones and halogen anthraquinones which may be employed in preparing the pigment dyes according to the present invention are inter alia Bz - 1 - bromo - benzanthrone, Bz-1-chloro-benzanthrone, 6-Bz-1-dibromo-benzanthrone, 1-bromo-anthraquinone, 1-chloro-anthraquinone, 1,5-dichloro-anthraquinone, 1,8 - dichloro - anthraquinone, 1-hydroxy-4-bromo - anthraquinone, 1-amino-2-methyl-4-bromo-anthraquinone, 1 - benzoylamino-2-methyl-4-bromo-anthraquinone, 1-amino-2,4-dibromo-anthraquinone, etc.

The reaction between the 5-amino-1,9-isothiazolanthrone and the halogen benzanthrone or halogen anthraquinone is advantageously carried out in organic medium and, in some cases, in the presence of an acid-binding agent. Suitable organic media for this purpose are inter alia naphthalene, 1,2,3,4 - tetrahydronaphthalene, decahydronaphthalene and, preferably, nitrobenzene. Appropriate acid-binding agents are, for example, the hydroxides, carbonates, bicarbonates and acetates of the alkali metals, and the hydroxides, oxides and carbonates of the alkaline earth metals. The reactants react with each other quite rapidly at elevated temperature; the condensation periods range from about 5 to about 20 hours. The condensation of the 5-amino-1,9-isothiazolanthrone with halogen benzanthrone or with halogen anthraquinone can be accelerated by the addition of a catalyst, such as copper or a copper compound. Moreover, it is advantageous to remove any evolved hydrogen halide or water (which may be produced, depending upon whether and what type of acid-binding agent is employed) by passing a gentle stream of air or of inert gas over the condensation mass. The resultant condensation product can generally be filtered off after cooling the reaction mixture to about 40–100° C. It is then advantageously washed first with an organic liquid and then—if desired, after displacement of the organic wash liquid by a low molecular alcohol—with hot water, after which it may be dried.

In order to convert it into a pigment dyestuff preparation, the condensation product is preferably dissolved in concentrated sulfuric acid. By pouring the resultant solution into cold or warm water, maintained in a state of very rapid motion (by energetic stirring or the like), and then filtering off the precipitated dyestuff and washing it neutral, the dyestuff is obtained in a form which makes it possible to convert it into finished ready-to-use pigment pastes, by after treatment in suitable machines, such as roller grinders, mills, homogenizing machines, etc. The pigment dyestuffs can also be obtained in powder form by subjecting the pigment pastes to an appropriate drying process, for example in an atomization drier, and finally—if necessary—grinding the dry powder in a suitable grinding mill.

Alternatively, condensation products can, if desired, be comminuted to the state of fineness necessary for the practical use thereof, without going through the steps of dissolving in and precipitating from sulfuric acid. This alternative procedure involves grinding the condensation products—optionally, with the addition of a grinding aid such as sodium chloride, sodium sulfate or calcium carbonate, in suitable machines or mills.

The pigment dyes obtained according to the invention are useful for the coloring of paper pulp and the like, for printing on textiles or on synthetic masses, for the dyeing of plastic materials, for the spin-dyeing of synthetic fibers such as viscose silk or acetate silk, etc. The thus-obtained dyeings are distinguished, in general, by the magnitude of the depth thereof and by their outstanding fastness properties.

The condensation of the 5-amino-1,9-isothiazolanthrone with the other reactants according to the present invention is preferably carried out within a temperature range of about 100° C. to about 220° C.

Illustrative embodiments of the invention are set forth, solely by way of example and not at all by way of limitation, in the following examples. In the latter, the parts and percentages are by weight, and the temperatures are in degrees centigrade.

Example 1

55 parts of 5-amino-1,9-isothiazolanthrone, 70 parts of Bz-1-bromobenzanthrone, 25 parts of anhydrous sodium carbonte, 2.5 parts of crystalline copper sulfate and 350 parts of nitrobenzene are stirred together at 180–210° until the ensuing condensation is terminated. This will be the case after about 16 hours; the evolved water is advantageosusly removed during the procedure by means of a gentle current of air. The condensation product which precipitates out, is filtered off at 80°, washed first with ethyl alcohol and then with hot water, and finally dried. There is thus obtained 5-benzanthronylamino-1,9-isothiazolanthrone of the formula

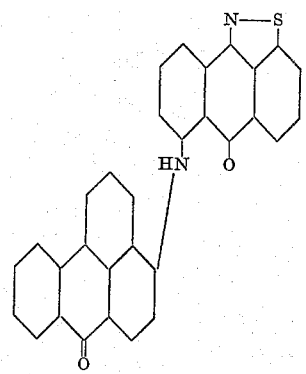

in the form of a dark crystalline powder.

30 parts of this condensation product are dissolved in the six-fold quantity of sulfuric acid of 96–100% strength and then energetically stirred into 2000 parts of water at 70–80°. The pigment dyestuff which precipitates out is filtered off and washed neutral. Then, after addition of dinaphthylmethanedisulfonic acid, it is comminuted on a roller crusher, in a grinding mill or in any other suitable machine and then worked up into the form of a paste. This paste, when used for printing textiles or for the spin-dyeing of artificial silks, yields, when printed or dyed in deep shades, scarlet-brown tints, and when printed or dyed in clear shades, scarlet tints of excellent fastness properties.

*Example 2*

120 parts of 5-amino-1,9-isothiazolanthrone, 130 parts of 1-chloroanthraquinone, 58 parts of anhydrous sodium carbonate, 5 parts of crystalline copper sulfate and 850 parts of nitrobenzene are stirred together at 180–210°, until the ensuing condensation is terminated. The crystalline condensation product which separates out is filtered at 80°, washed with hot ethyl alcohol followed by hot water, and is finally dried.

200 parts of the thus-prepared condensation product, 5 - (anthraquinonyl - 1')-amino-1,9-isothiazolanthrone of the formula

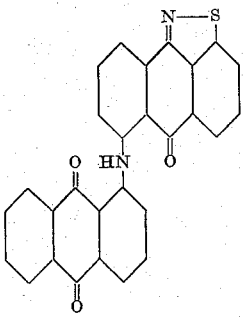

are dissolved in 1200 parts of sulfuric acid of 95–100% strength. The solution is then stirred, after the manner described in Example 1, into 10000 parts of water at 20–80°, whereupon the precipitated pigment dyestuff is worked up according to Example 1. It yields in spin-dyeing synthetic fibers, in paper pulp and in printing on textiles, red shades of very good fastness properties.

*Example 3*

26 parts of 5-amino-1,9-isothiazolanthrone, 13.5 parts of 1,5-dichloroanthraquinone, 13 parts of anhydrous sodium carbonate, 1.2 parts of anhydrous cuprous chloride and 160 parts of nitrobenzene are stirred together at 190°–210° until the ensuing condensation is terminated. The condensation product, 1,5 - di - (1',9'-isothiazolanthronyl-5')-aminoanthraquinone of the formula

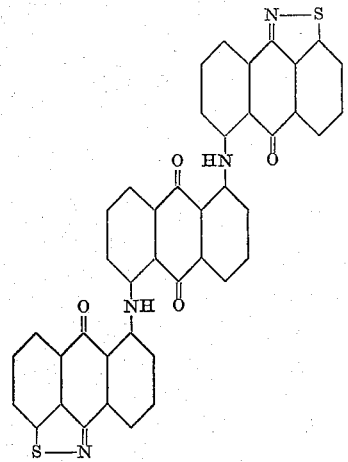

is filtered off at 80°, washed with hot ethyl alcohol and hot water, and dried. 30 parts of the thus-obtained condensation product are dissolved in the five- to eight-fold quantity of sulfuric acid monohydrate and then poured into energetically stirred water (2000 parts) at 70–80°. The pigment dyestuff which precipitates is filtered off, washed neutral, and comminuted together with 15 parts of dinaphthylmethanedisulfonic acid in a suitable machine, for example on a roller crusher or in a ball mill, down to a particle size of no greater than 0.5–2 microns. The resultant pigment paste may be employed as such or, after drying in an atomization drier, as a powder and yields very pure bordeaux-colored spin-dyeings of excellent fastness properties.

*Example 4*

2 parts of a 10% aqueous paste of the pigment dyestuff obtained according to Example 1 are added in a hollander to a mixture of 100 parts of bleached sulfite cellulose in 2000 parts of water; a medium depth coloration of the paper is achieved. The colored paper pulp is then admixed—in order simultaneously to achieve a sizing effect and a fixing of the pigment dyestuff on the paper fibers—with 40 parts of a 2.5% rosin soap emulsion and then with 40 parts of an aqueous aluminum sulfate solution of 5% strength.

In essentially similar manner paper pulp can also be colored with any of the other dyestuffs hereinbefore described.

*Example 5*

A further important field of application of the hereinbefore described pigment dyestuffs resides—as has already been mentioned—in the dyeing of synthetic fibers in the form of the spinning mass. The spin-dyeing of viscose artificial silk consists essentially in dyeing the matured viscose solutions by stirring the dyestuff pigment thereinto and then spinning the colored material with the aid of the usual spinning apparatus.

100 parts of a 20% aqueous paste of the pigment dyestuff obtained according to Example 1 are added, in a stirring apparatus to 22,500 parts of an aqueous viscose solution of approximately 9% strength. The dyed spinning mass is then stirred for 15 minutes, deaerated, and subjected to the usual spinning and desulfurizing treatments.

The other hereinbefore disclosed dyestuffs may be similarly used for dyeing spinning masses.

*Example 6*

A paste, consisting of 100 parts of an aqueous paste (of 20% strength) of a pigment dyestuff obtainable according to Example 5, 400 parts of tragacanth (3%), 400 parts of an aqueous egg albumin solution of 50% strength and 100 parts of a non-ionogenic wetting agent, is printed onto a textile fabric. The print is dried and then steamed for a half hour at 100–101°.

In the printing paste the dyestuff mentioned in the preceding paragraph may be replaced by any of the other hereinbefore described dyestuffs and/or the tragacanth and egg albumin may be replaced by any other binding agents conventionally used for fixing pigments on fibers, such for example as those binding agents which involve synthetic resins.

Furthermore valuable pigment dyestuffs can be prepared, when

In Example 1, Bz-1-bromobenzanthrone is replaced by Bz-1-chlorobenzanthrone or 6-Bz-1-dibromobenzanthrone;

In Example 2, 1-chloroanthraquinone is replaced by 1-hydroxy-4-bromoanthraquinone or 1-amino-2-methyl-4-bromoanthraquinone or 1-benzoylamino-2-methyl-4-bromoanthraquinone or 1-amino-2,4-dibromoanthraquinone;

In Example 3, 1,5-dichloroanthraquinone is replaced by 1,8-dichloroanthraquinone.

Apart from the acid binding agents used in the above examples, i. e. sodium carbonate and sodium acetate, there are also suitable in a similar way the carbonates and acetates of the remaining alkali metals, the bicarbonates and the hydroxides of the alkali metals, the carbonates, hydroxides and oxides of the alkaline earth metals and magnesium oxide.

Apart from dinaphthylmethanedisulfonic acid there may be used for grinding the condensation products to form pigment dyestuff pastes or pigment dyestuff powders a large variety of dispersing agents, for example alkylpolyglycolethers having 20 to 25 ethyleneoxy groups such as cetyl-, stearyl- or oleylpolygylcolether, alkylphenylpolyglycolethers such as dodecylphenylpolyglycolether, further alkylarylsulfonates such as alkylbenzenesulfonate and alkylnaphthalenesulfonate, sulfonated oils, fatty acid condensation products, alkylsulfates and -sulfonates having a higher molecular weight and many others besides.

Having thus disclosed the invention, what is claimed is:

1. A condensation product which corresponds to the formula

Y—R—Z wherein R stands for a radical selected from the group consisting of benzanthronyl and anthraquinonyl radicals, Y stands for a radical of the formula

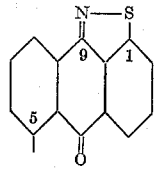

which is connected at the 5-position to R by an —NH— bridge, and Z is a member selected from the group consisting of hydrogen and the Y radicals as hereinbefore defined.

2. 5-benzanthronylamino-1,9-isothiazolanthrone.

3. 5 - (anthraquinonyl - 1') - amino - 1,9 - isothiazolanthrone.

4. 1,5 - di - (1',9' - isothiazolanthronyl - 5') - aminoanthraquinone.

References Cited in the file of this patent
UNITED STATES PATENTS
2,149,433   Grossman et al. _____ Mar. 7, 1939